United States Patent
Karve et al.

(10) Patent No.: US 8,776,018 B2
(45) Date of Patent: Jul. 8, 2014

(54) SYSTEM AND METHOD FOR RESTARTABLE PROVISIONING OF SOFTWARE COMPONENTS

(75) Inventors: Alexei A. Karve, Mohegan Lake, NY (US); Ajay Mohindra, Yorktown Heights, NY (US); Randy A. Rendahl, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1198 days.

(21) Appl. No.: 11/972,763

(22) Filed: Jan. 11, 2008

(65) Prior Publication Data

US 2009/0182782 A1 Jul. 16, 2009

(51) Int. Cl.
*G06F 9/44* (2006.01)
*G06F 11/00* (2006.01)

(52) U.S. Cl.
USPC .......................................... 717/120; 714/38.1

(58) Field of Classification Search
USPC .................................. 717/120–121, 168–178
See application file for complete search history.

(56) References Cited

U.S. PATENT DOCUMENTS

| | | | |
|---|---|---|---|
| 5,630,047 A * | 5/1997 | Wang | 714/15 |
| 5,802,267 A * | 9/1998 | Shirakihara et al. | 714/15 |
| 5,923,833 A | 7/1999 | Freund et al. | |
| 6,026,499 A | 2/2000 | Shirakihara et al. | |
| 6,185,702 B1 * | 2/2001 | Shirakihara et al. | 714/38.1 |
| 6,263,338 B1 * | 7/2001 | Ronstrom et al. | 1/1 |
| 6,453,430 B1 | 9/2002 | Singh et al. | |
| 6,556,544 B1 | 4/2003 | Lee | |
| 6,795,966 B1 * | 9/2004 | Lim et al. | 718/1 |
| 6,898,702 B1 | 5/2005 | Evans | |

(Continued)

FOREIGN PATENT DOCUMENTS

| | | |
|---|---|---|
| JP | H09138754 | 5/1997 |
| JP | 2002505768 | 2/2002 |
| JP | 2008502953 | 1/2008 |

OTHER PUBLICATIONS

Stellner, "CoCheck: Checkpointing and process migration for MPI", Symposium, 1996., Proceedings of IPPS'96, retrieved from <http://ieeexplore.ieee.org/stamp/stamp.jsp?tp=&arnumber=508106> pp. 526-531.*

(Continued)

*Primary Examiner* — Don Wong
*Assistant Examiner* — Marina Lee
(74) *Attorney, Agent, or Firm* — Tutunjian & Bitetto, P.C.; Preston Young

(57) ABSTRACT

A system and method for associating a state with a distributed system and transitioning component states with recovery to reverse transitioning attempts includes defining a global state representing an overall provisioning state of a plurality of components involved in a system wherein a set of global states are employed as provisioning checkpoints. Individual software component methods are defined for transitioning from one state to another. Individual states are associated with a global state. A rollback method is defined by which a destination global state may be rolled back to a previous global state in an event of a failure.

23 Claims, 8 Drawing Sheets

(56) References Cited

U.S. PATENT DOCUMENTS

| | | | |
|---|---|---|---|
| 7,093,088 B1 | 8/2006 | Todd et al. | |
| 7,206,805 B1* | 4/2007 | McLaughlin, Jr. | 709/203 |
| 7,263,590 B1 | 8/2007 | Todd et al. | |
| 7,275,183 B2* | 9/2007 | Santos et al. | 714/35 |
| 7,337,195 B2* | 2/2008 | Hrle et al. | 1/1 |
| 7,536,591 B2* | 5/2009 | Varadarajan et al. | 714/15 |
| 7,613,743 B1* | 11/2009 | Giampaolo et al. | 1/1 |
| 7,707,451 B2* | 4/2010 | Buskens et al. | 714/2 |
| 7,761,739 B2* | 7/2010 | Ruscio et al. | 714/15 |
| 7,787,360 B2* | 8/2010 | Windisch et al. | 370/217 |
| 7,966,605 B1* | 6/2011 | Di Fabbrizio et al. | 717/127 |
| 7,996,716 B2* | 8/2011 | Butterworth | 714/17 |
| 8,108,718 B2* | 1/2012 | Muralimanohar et al. | 714/12 |
| 8,132,043 B2* | 3/2012 | Dash et al. | 714/4.1 |
| 2002/0010910 A1* | 1/2002 | Crudele et al. | 717/4 |
| 2004/0001476 A1 | 1/2004 | Islam et al. | |
| 2005/0055606 A1* | 3/2005 | Kutan et al. | 714/15 |
| 2005/0132351 A1 | 6/2005 | Randall et al. | |
| 2005/0257090 A1 | 11/2005 | Santos et al. | |
| 2006/0294435 A1* | 12/2006 | Vick et al. | 714/38 |
| 2006/0294507 A1* | 12/2006 | Buskens et al. | 717/133 |
| 2007/0277056 A1* | 11/2007 | Varadarajan et al. | 714/15 |
| 2009/0327807 A1* | 12/2009 | Varadarajan et al. | 714/15 |

OTHER PUBLICATIONS

Chandy et al. "Distributed Snapshots: Determining Global. States of Distributed Systems", ACM Transactions on Computer Systems, vol. 3 Issue 1, Feb. 1985, pp. 63-75.*

Huang et al., Cheap Recovery: A Key to Self-Managing State; ACM Transactions on Storage, vol. 1, No. 1, Dec. 2004; pp. 38-70.

Keeton et al., Lessons and Challenges in Automating Data Dependability; ACM Digital Library; SIGOPSEW, 2004; 6 pages.

Lopez et al., Using Process Restarts to Improve Dynamic Provisioning; 15th IFIP/IEEE International Workshop on Distributed Systems: Operations and Management, DSOM 2004; Davis, CA, Nov. 15-17, 2004; pp. 220-231.

Shen et al., Shared Risk Link Group (SRLG)—Diverse Path Provisioning Under Hybrid Service Level Agreements in Wavelength-Routed Optical Mesh Networks; IEEE/ACM Transactions on Networking, vol. 13, No. 4; Aug. 2005; pp. 918-931.

Tripathi et al., Policy-Driven Configuration and Management of Agent Based Distributed Systems; SELMAS '05 at ICSE' 05, May 1 5-16, 2004; St. Louis, Missouri; 2005; pp. 1-7.

Hursey, et al. The Design and Implementation of Checkpoint/Restart Process Fault Tolerance for Open MPI. 2007 IEEE. International Parallel and Distributed Processing Symposium. Mar. 2007. http://www.open-mpi.org/papers/dpdns-2007/dpdns-2007.pdf (8 pages).

* cited by examiner

SYSTEM AND METHOD FOR RESTARTABLE PROVISIONING OF SOFTWARE COMPONENTS

BACKGROUND

1. Technical Field

The present invention relates to computer network management and, more particularly, to systems and methods for providing restartable provisioning of software components.

2. Description of the Related Art

Deploying a solution in a data-center requires the installation and configuration of several software components across multiple tiers. Each software component needs to be independently installed and configured. This task is usually done manually or using provisioning tools such as IBM's Tivoli Provisioning Manager™ for automated provisioning. Failure during installation/configuration of any component results in the scrapping of the provisioning run and restarting the provisioning, as individual components are often linked together through configurations that make the selective unconfiguration/uninstallation difficult.

Prior work on checkpoint/restart for single process components focuses on the installation and failure recovery of one or more related components within a single node environment. Additionally, several patents with related techniques include the following. U.S. Pat. No. 6,453,430, entitled, "Apparatus and methods for controlling restart conditions of a faulted process", focuses on recovery strategies for processing failure within a single node with multiple and varied recovery steps. U.S. Pat. No. 5,923,833, entitled, "Restart and recovery of OMG-compliant transaction systems", focuses on restart and recovery techniques in a transaction system. U.S. Pat. No. 6,026,499, entitled, "Scheme for restarting processes at distributed checkpoints in client-server computer system", focuses on a distributed method of restarting processes across a plurality of nodes in the event of a failure in one, without looking at the process of provisioning, capturing global state, or providing for rollback capabilities.

The traditional approaches to handling failures and restartability do not work because at least taking a consistent distributed checkpoint is not feasible in these methods.

SUMMARY

A system and method for associating a state with a distributed system and transitioning component states with recovery to reverse transitioning attempts includes defining a global state representing an overall provisioning state of a plurality of components involved in a system wherein a set of global states are employed as provisioning checkpoints. Individual software component methods are defined for transitioning from one state to another. Individual states are associated with a global state. A rollback method is defined by which a destination global state may be rolled back to a previous global state in an event of a failure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
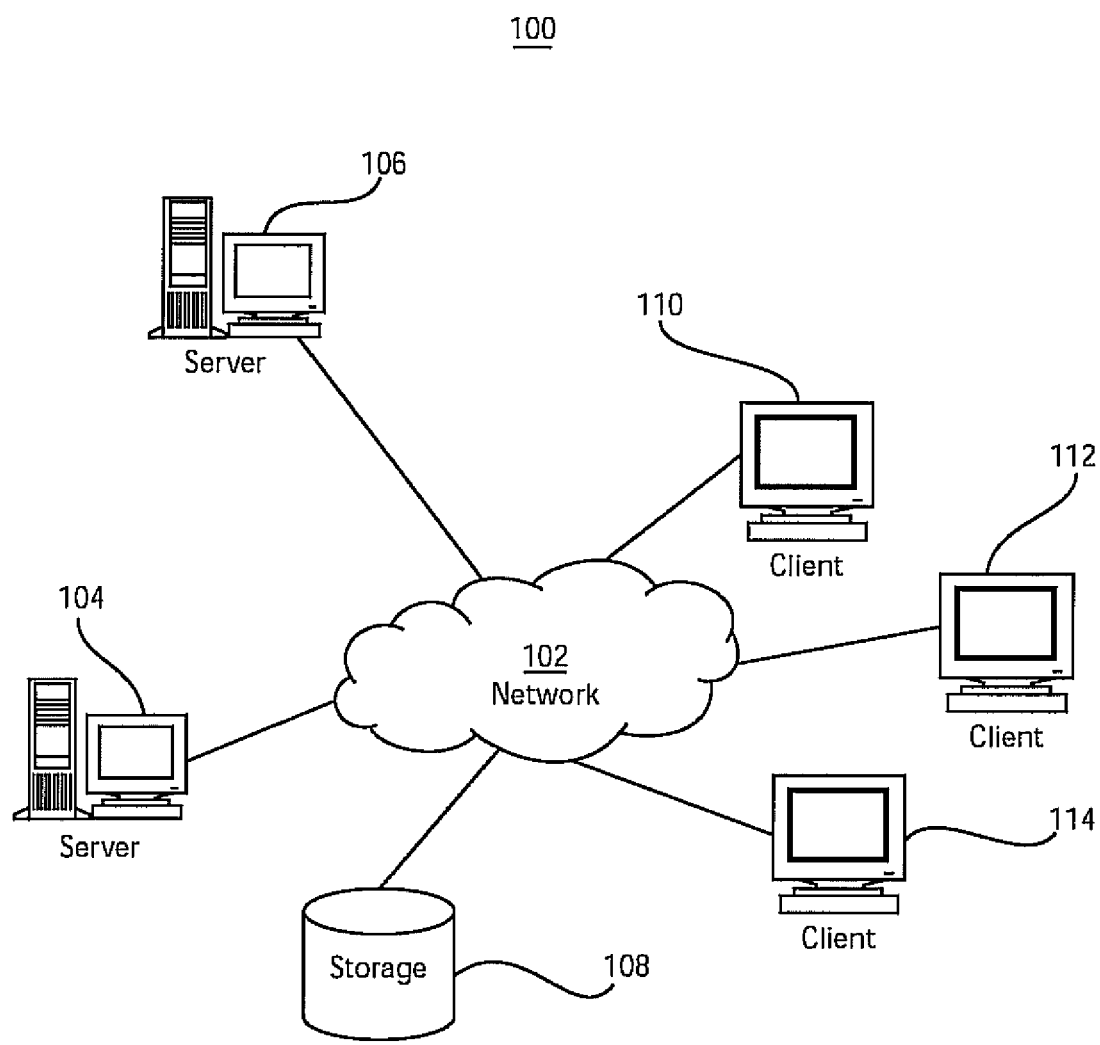
FIG. 1 is a block diagram showing a network data processing system, which may be used to implement an exemplary embodiment in accordance with the present principles.

Systems and methods for automated provisioning of computing resources in a distributed computing network are provided and include the use of global state checkpoints, enabling controlled rollback of provisioning in the event of failure. A global state includes individual states of a plurality of software components involved in the provisioning. Associated with each global state is a rollback procedures) needed to move back to a previous global state checkpoint in the event of a failure during a provisioning attempt to move from one checkpoint to the next.

According to an exemplary embodiment, one method for automated provisioning of computing resources in a distributed computing network includes the generation of a single global state representing an ongoing state of the automated provisioning process. The global state includes individual states of the software components in a distributed computing network. The global state transitions from one state to the next through incremental provisioning steps of the individual software components in the distributed system. Associated with each state are rollback procedures. In a provisioning failure situation, the associated rollback procedures may be used to bring the system back to a previous system state.

It is to be understood that exemplary embodiments of the present invention described herein may be implemented in various forms of hardware, software, firmware, special purpose processors, or a combination thereof. An exemplary embodiment of the present invention may take the form of an entirely hardware embodiment, an entirely software embodiment or an embodiment including both hardware and software elements.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (RON), a rigid magnetic disk and an optical disk. Current examples of optical disks include compact disk-read only memory (CD-ROM), compact disk—read/write (CD-R/W) and DVD.

An exemplary embodiment may be implemented in a software medium as an application program tangibly embodied on one or more program storage devices, such as for example, computer hard disk drives, CD-ROM (compact disk-read only memory) drives and removable media such as CDs, DVDs (digital versatile discs or digital video discs), Universal Serial Bus (USB) drives, floppy disks, diskettes and tapes, readable by a machine capable of executing the program of instructions, such as a computer. The application program may be uploaded to, and executed by, an instruction execution system, apparatus or device comprising any suitable architecture. It is to be further understood that since exemplary embodiments of the present invention depicted in the accompanying drawing figures may be implemented in software, the actual connections between the system components (or the flow of the process steps) may differ depending upon the manner in which the application is programmed. In a preferred embodiment, the present invention is implemented in software, which may include but is not limited to firmware, resident software, microcode, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a network data processing system 100, which may be used to implement an exemplary embodiment of the present invention, is illustratively shown. Network data processing system 100 includes a network of computers 104, 106, 110, 112, 114 . . . , which can be implemented using any suitable computers. Network data processing system 100 may include, for example, a personal computer, workstation or mainframe. Network data processing system 100 may employ a client-server network architecture in which each computer or process on the network is either a client or a server.

Network data processing system 100 includes a network 102, which is a medium used to provide communications links between various devices and computers within network data processing system 100. Network 102 may include a variety of connections such as wires, wireless communication links, fiber optic cables, connections made through telephone and/or other communication links.

A variety of servers, clients and other devices may connect to network 102. For example, a server 104 and a server 106 may be connected to network 102, along with a storage unit 108 and clients 110, 112 and 114, as shown in FIG. 1. Storage unit 108 may include various types of storage media, such as, for example, computer hard disk drives, CD-ROM drives and/or removable media such as CDs, DVDs, USB drives, floppy disks, diskettes and/or tapes. Clients 110, 112 and 114 may be, for example, personal computers and/or network computers.

Client 110 may be a personal computer. Client 110 may comprise a system unit that includes a processing unit and a memory device, a video display terminal, a keyboard, storage devices, such as floppy drives and other types of permanent or removable storage media, and a pointing device such as a mouse. Additional input devices may be included with client 110, such as for example, a joystick, touchpad, touchscreen, trackball, microphone, and the like.

Clients 110, 112 and 114 may be clients to server 104, for example. Server 104 may provide data, such as boot files, operating system images, and applications to clients 110, 112 and 114. Network data processing system 100 may include other devices not shown.

Network data processing system 100 may comprise the Internet, for example, with network 102 representing a worldwide collection of networks and gateways that use the Transmission Control Protocol/Internet Protocol (TCP/IP) suite of protocols to communicate with one another. The Internet includes a backbone of high-speed data communication lines between major nodes or host computers including a multitude of commercial, governmental, educational and other computer systems that route data and messages.

Network data processing system 100 may be implemented as any suitable type of networks, such as for example, an intranet, a local area network (LAN) and/or a wide area network (WAN). The network data processing elements in FIG. 1 are intended as an example, and not as an architectural limitation for embodiments of the present invention.

Figure 2:
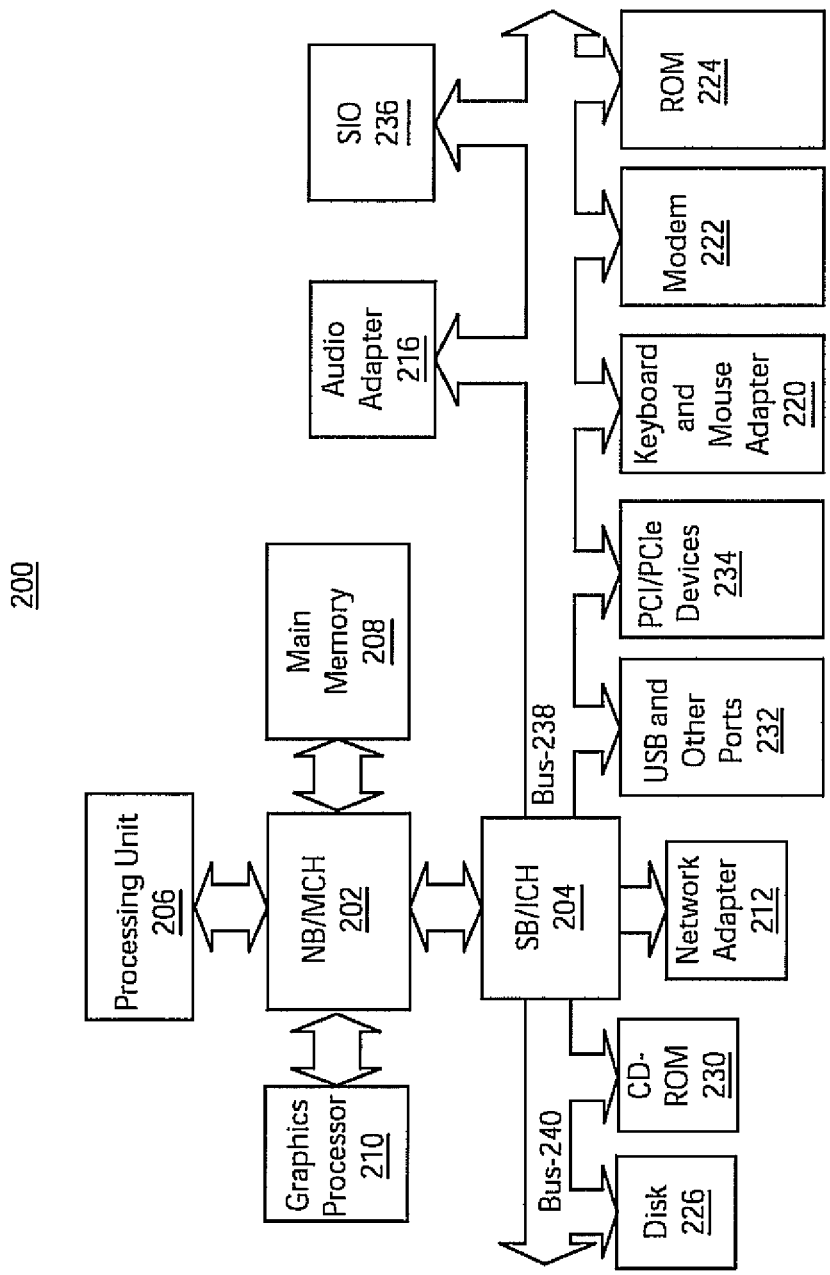
FIG. 2 is a block diagram of a data processing system, which may be used to implement an exemplary embodiment in accordance with the present principles.

Referring to FIG. 2, a block diagram of a data processing system 200, which may be used to implement exemplary embodiments, is illustratively shown. Data processing system 200 is an example of a computer, such as server 104 or client 110 of FIG. 1, in which computer usable code or instructions implementing processes in accordance with the present principles may be located.

In this example, data processing system 200 employs a hub architecture including a north bridge and memory controller hub (NB/MCH) 202 and a south bridge and input/output (I/O) controller hub (SB/ICH) 204. Processing unit 206 which may include one or more processors, main memory 208, and a graphics processor 210 are coupled to the north bridge and memory controller hub 202. Graphics processor 210 may be coupled to the NB/MCH 202 through an accelerated graphics port (AGP). Data processing system 200 may be, for example, a symmetric multiprocessor (SMP) system including a plurality of processors in processing unit 206. Data processing system 200 may be a single processor system.

Local area network (LAN) adapter 212 is coupled to south bridge and I/O controller hub 204. Audio adapter 216, keyboard and mouse adapter 220, modem 222, read only memory (ROM) 224, universal serial bus (USB) ports and other communications ports 232, and PCI/PCIe (PCI Express) devices 234 are coupled to south bridge and I/O controller hub 204 through bus 238, and hard disk drive (HDD) 226 and CD-ROM drive 230 are coupled to south bridge and I/O controller hub 204 through bus 240.

Examples of PCI/PCIe devices include Ethernet adapters, add-in cards, and PC cards for notebook computers. In general, PCI uses a card bus controller while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system, which may run on processing unit 206, coordinates and provides control of various components within data processing system 200. For example, the operating system may be a commercially available operating system such as Microsoft® Windows® XP (Microsoft and Windows are trademarks or registered trademarks of Microsoft Corporation).

An object-oriented programming system, such as the Java™ programming system, may run in conjunction with the operating system and provides calls to the operating system from Java programs or applications executing on data processing system 200 (Java and all Java-based marks are trademarks or registered trademarks of Sun Microsystems, Inc.).

Instructions for the operating system, object-oriented programming system, applications and/or programs of instructions are located on storage devices, such as, for example, hard disk drive 226, and may be loaded into main memory 208 for execution by processing unit 206. Processes of exemplary embodiments may be performed by processing unit 206 using computer usable program code, which may be located in a memory, such as for example, main memory 20B, read only memory 224 or in one or more peripheral devices.

It will be appreciated that the hardware depicted in FIGS. 1 and 2 may vary depending on the implementation. Other internal hardware or peripheral devices, such as flash memory, equivalent non-volatile memory, or optical disk drives and the like, may be used in addition to or in place of the depicted hardware. Processes of embodiments in accordance with the present principles may be applied to a multiprocessor data processing system.

Data processing system 200 may take various forms. For example, data processing system 200 may be a tablet computer, laptop computer, or telephone device. Data processing system 200 may be, for example, a personal digital assistant (PDA), which may be configured with flash memory to provide non-volatile memory for storing operating system files and/or user-generated data. A bus system within data processing system 200 may include one or more buses 238, 240, such as a system bus, an I/O bus and PCI bus. It is to be understood that the bus system may be implemented using any type of communications fabric or architecture that provides for a transfer of data between different components or devices coupled to the fabric or architecture. A communications unit may include one or more devices used to transmit and receive data, such as modem 222 or network adapter 212. A memory may be, for example, main memory 208, ROM 224 or a cache such as found in the north bridge and memory controller hub 202. A processing unit 206 may include one or more processors or CPUs.

Methods for automated provisioning according to exemplary embodiments may be performed in a data processing system such as data processing system 100 shown in FIG. 1 or data processing system 200 shown in FIG. 2.

A data processing system suitable for storing and/or executing a program of instructions may include one or more processors coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution.

Data processing system 200 may include input/output (I/O) devices, such as for example, keyboards, displays and pointing devices, which can be coupled to the system either directly or through intervening I/O controllers. Network adapters may also be coupled to the system to enable the data processing system to become coupled to other data processing systems or remote printers or storage devices through intervening private or public networks. Network adapters include, but are not limited to, modems, cable modem and Ethernet cards.

Figure 3:
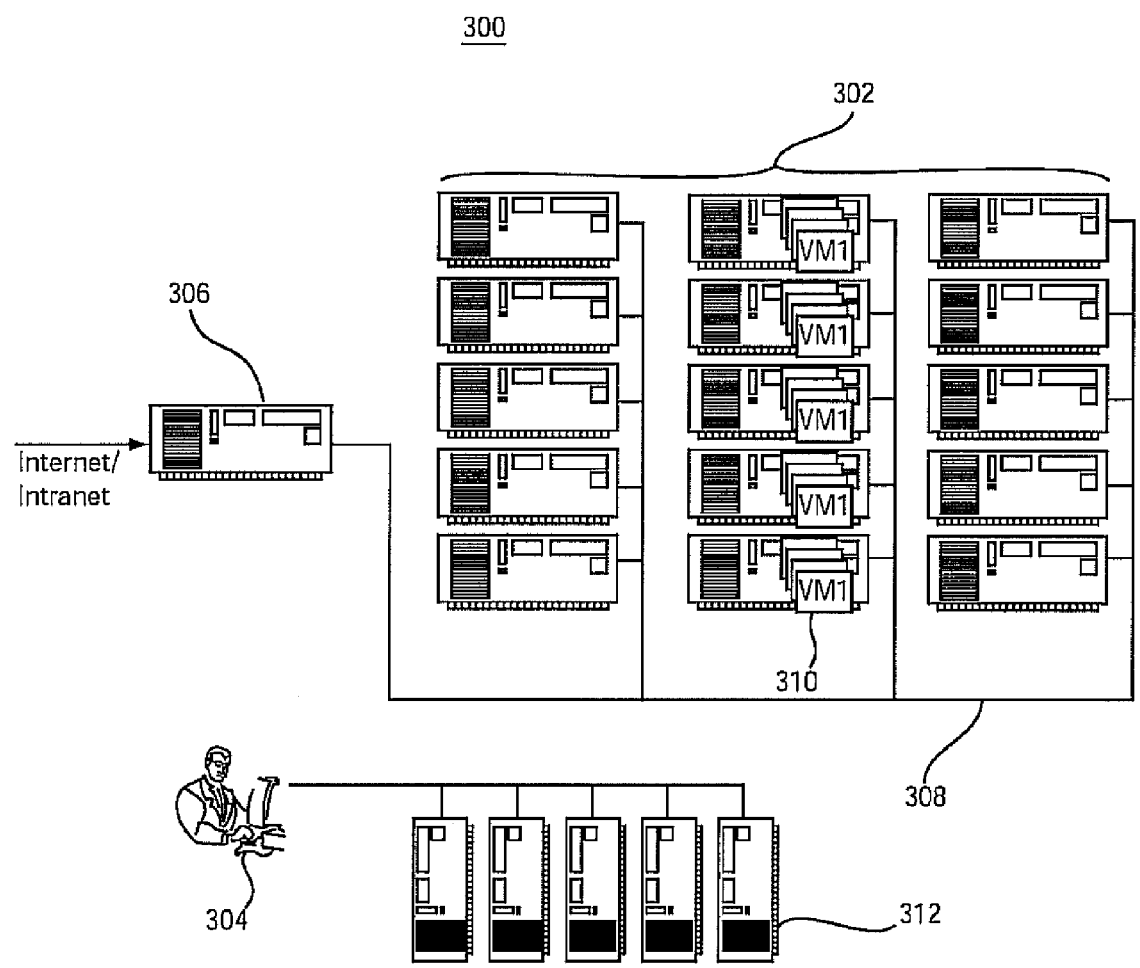
FIG. 3 is a schematic representation of a service delivery environment, which may be used to implement an exemplary embodiment in accordance with the present principles.

Referring to FIG. 3, a schematic representation of a service delivery environment 300 is illustratively depicted, which may be used to implement one exemplary embodiment. Service delivery environment 300 includes a farm of physical servers 302, DMZ (demilitarized zone) 306 and management servers 312. The term "demilitarized zone" or acronym "DMZ" refers to a network area that sits between an organization's internal network and an external network, such as the Internet.

User requests from the Internet or an intranet are received by a router device. For example, a router device may be located within the DMZ 306. The router device may be implemented by a reverse proxy, such as IBM's WebSeal™ product.

User requests may be directed via network 308 to a provisioning solution that is hosted on a collection of real or virtual machines 310 running on the server farm 302. Management servers 312 that may be used to manage the server farm 302 are coupled via network 308 to the physical servers 302. The management servers 312 may be used by system administrators 304 to manage and monitor the server farm. Software running on the management servers 312 may assist with various tasks such as software metering, application provisioning, monitoring all (or selected) applications, and problem determination of the server farm.

Figure 4:
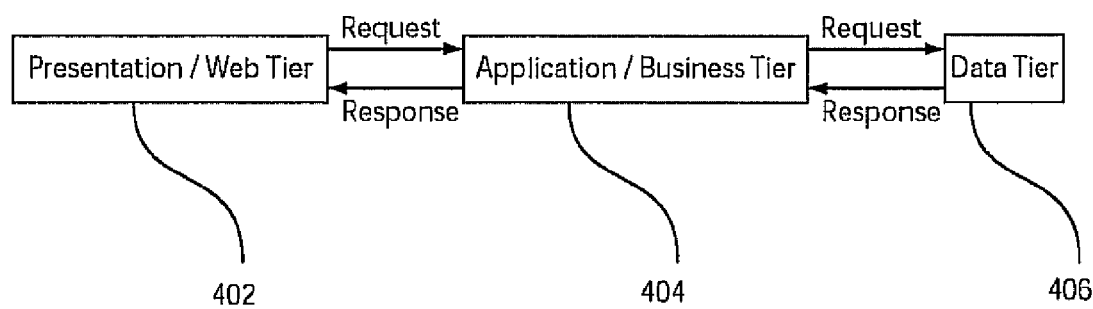
FIG. 4 is a block diagram illustrating an example of a multi-tier model, which may be used to implement an exemplary embodiment in accordance with the present principles.

Referring to FIG. 4, a block/flow diagram illustrating an example of a multi-tier system, which may be used to implement an exemplary embodiment in accordance with the present principles. The depicted model is a three-tier model 400. Each tier may be multi-tiered itself (in which case the overall architecture is called an "n-tier architecture"). Logical tiers can be physically implemented in different ways. For example, all three tiers may be physically implemented on different servers, which can lead to greater scalability and an ability to process more client requests simultaneously.

A first tier 402 is the presentation or Web tier, which dynamically generates content in various formats for the user. The presentation tier 402 includes components that handle interactions between users and a business tier 404. User interactions with the presentation tier 402 may be via a Web browser. A Web browser that supports an HTML-based front end, for example, communicates with a Web server, which forwards back a modified or new Web page to the user. It will be appreciated that a Web server can employ different approaches to service a user request. These approaches include, but are not limited to, the Common Gateway Interface (CGI), Microsoft's Active Server Page (ASP), and the Java Server Page (JSP). Presentation tier (402) components may include HTML pages, images and computer readable code to display and process the HTML pages such as portlets and/or servlets.

A second tier 404 is the application or business tier. The components of the business tier 404 process the client requests and provide the business logic for an application. Business logic includes computer readable code that provides functionality to a particular application domain. Business logic may be embodied by the actual J2EE (Java 2 Platform, Enterprise Edition) application or a business process that performs functionality specific to a provisioning solution.

A third tier 406 is a database tier. The database tier 406 includes data and components to manage and provide access to the data, such as database management software.

Figure 5:
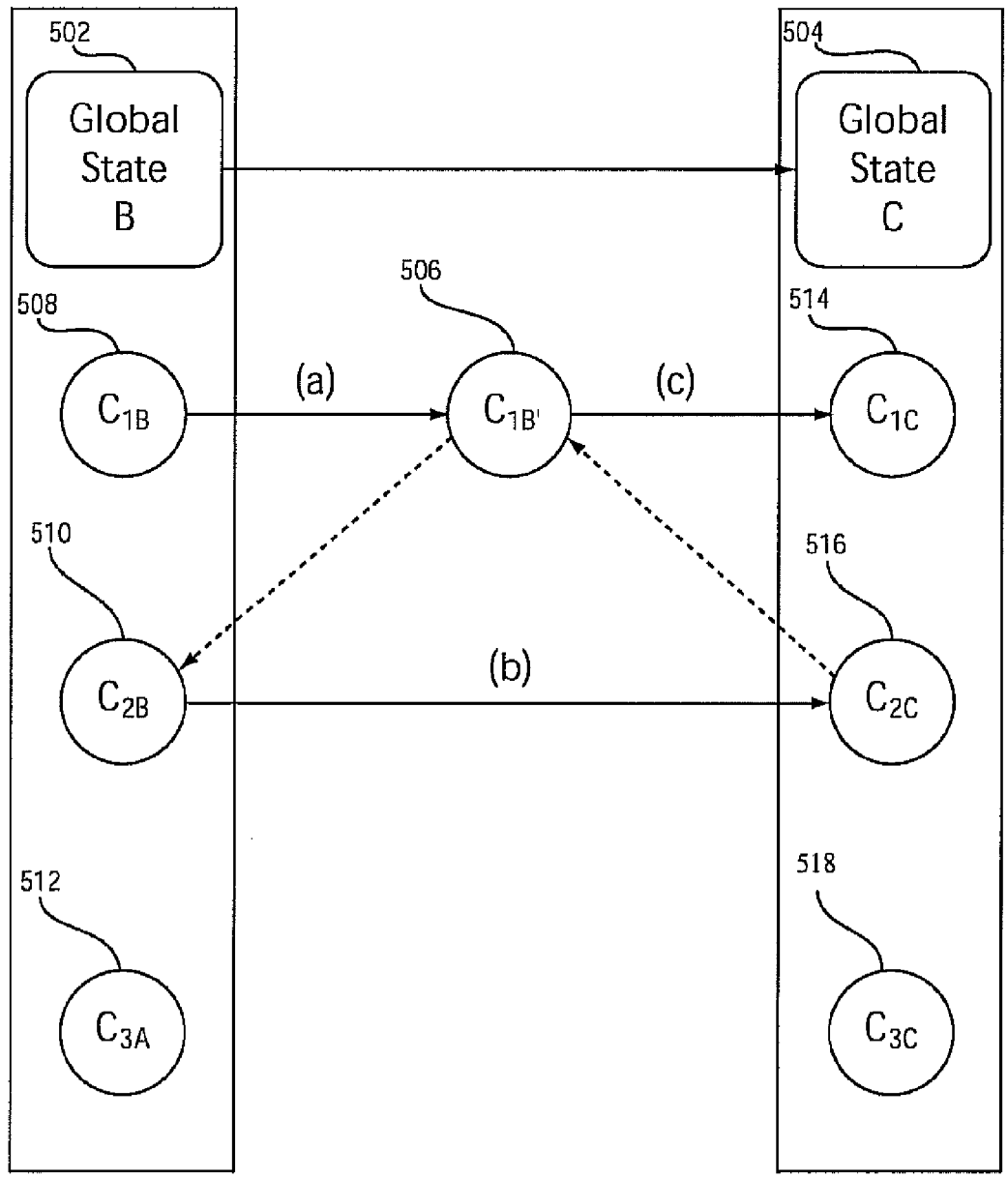
FIG. 5 is a diagram illustrating a global state made up of the elemental states of involved software components along with component level state transitions and rollback patterns to move from one global state to a next in accordance with the present principles.

Referring to FIG. 5, an example of a global state made up of individual software component states is illustratively depicted in accordance with the present principles. A global state 502 is made up of a tuple of component states 508, 510 and 512. Provisioning of a system includes moving the global state from state 502 to a state 504 through the individual state transitions of components, 508 to 514, 510 to 516 and 512 to 518. Component $C_{1B}$ moves through an intermediate state ($C_{1B'}$) 506 due to order dependencies between components $C_1$ and $C_2$ transitioning from 508 and 510 to the new global state 504.

In practice, an exemplary method captures the component states as a tuple representing the individual component states. An exemplary set of valid states may include NotInstalled, Installed, Started, Phase<n>, Completed where Phase<n> is component specific. In FIG. 5, Global state B (502) of components [$C_1$, $C_2$, $C_3$] may be [Installed, Installed, NotInstalled]. The intermediate state represented by the partial transition of $C_1$ (506) may be [Started, Installed, NotInstalled]. The final global state C (504) may be [Phase1, Phase1, Installed].

Figure 6:
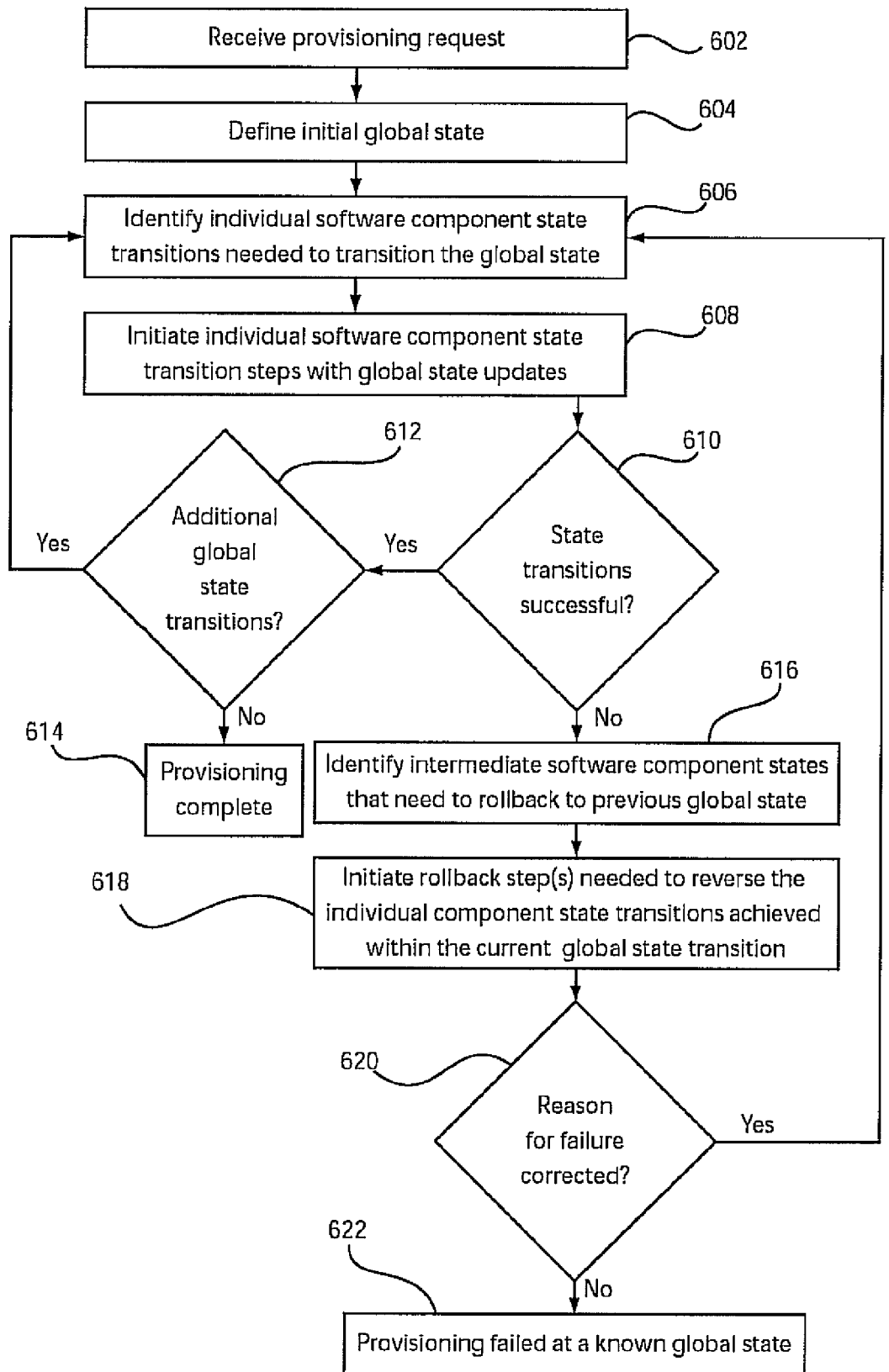
FIG. 6 is a block/flow diagram illustrating a system/method for provisioning software components in a distributed computing network by progressing through system states, including recovery steps on failed steps, according to an exemplary embodiment.

FIG. 6 is a flowchart illustrating a method for automated provisioning of computing resources in a distributed computing network, according to an exemplary embodiment.

Referring to FIG. 6, a provisioning request is received in block 602. Block 604 establishes an initial global state of the system by inspecting a current state of the components that make up the system. For example, individual software components may be deployed and configured in advance of the provisioning request. Block 606 examines the current states of the software components within the system to identify the individual steps and order dependencies among those steps needed to move to the next global state.

Block 608 initiates actual provisioning steps identified in block 606. These steps may be performed sequentially or in parallel, maintaining any order dependency defined in the state transition methods. Block 610 examines the success of the individual component state transitions to determine whether the new global state has been attained.

In the case of a failure in any block, the overall global state transition has failed and rollback procedures need to be initiated. Rollback procedures begin with block 616. Block 616 identifies the individual component state transitions that were attempted and need to be rolled back. Block 618 initiates the rollback steps identified in block 616 that are needed to move back to the previous global state checkpoint.

After rollback to a known state, the reason for the failure may be corrected through manual or automatic intervention outside the provisioning process. Block 620 is a determination of whether the problem has been corrected. In the event it is not, the system remains in a known state of failure as indicated in block 622. In the event the problem has been corrected, control returns to block 606.

In block 610, a successful state transition analysis results in an additional evaluation of the provisioning request to determine if there is another global state transition needed in block 612. When another global state transition is needed, control is returned to block 606. When no further state transition is needed at block 612, the system has been successfully provisioned as represented in block 614.

In practice, an exemplary method identifies the initial component states through inspection of the target environments. The provisioning logic incorporates the global state definitions and the set of transition steps through meta-data definition. Given the initial component states, the provisioning logic determines the next global state. Each of the transition steps necessary to achieve that state are initiated. If all the steps are successful, the new global state is achieved. If there are any remaining global states, the pattern is repeated. In the case that a step fails, the roll-back steps associated with the global state transition are initiated. Automated correction of the cause of the failure allows the provisioning process to be recontinued from the previous global state. If the cause is not corrected, the overall provisioning is left in a failed state at the previous global state.

A more detailed example is now presented in accordance with the present principles. A state based approach where the state of individual software components is linked to a single global state of a provisioning process is described. The provisioning of the solution transitions from one state to another state as provisioning progresses. Associated with each state of the software components are rollback procedures that are used for automatic recovery.

In case of a failure, the state of the distributed system is rolled back to the previous consistent state by executing "undo" procedures associated with each software component that is represented by the global state. A global state provides insight on a current state of the software components for manual recovery.

Figure 7:
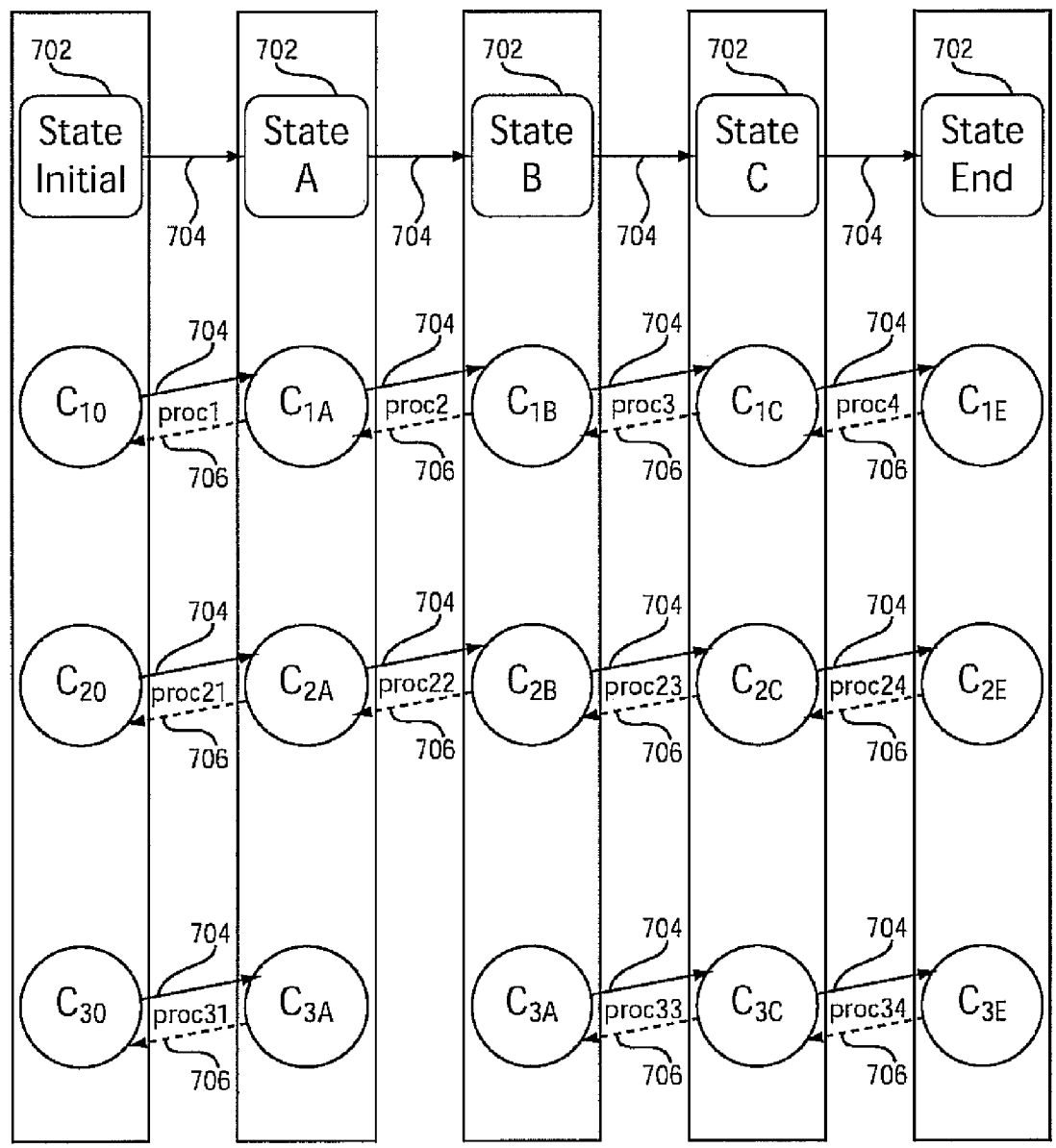
FIG. 7 is a diagram illustrating state management for managing a set of global states made up of component or elemental states of involved software components along with component level state transitions and rollback patterns to move from one global state to a next in accordance with the present principles.

Referring to FIG. 7, state management is shown in accordance with an illustrative embodiment. Each global state 702 is a composite state of its sub components C. For example, State Initial (702) includes two subcomponents in state $C_{10}$ and $C_{20}$.

Solid arrows 704 show state transition from one global state to another, and from each subcomponent state to another subcomponent state. Dashed arrows 706 with labels indicate recovery procedures that rollback the state of one subcomponent to a previous state. For example, procedure proc2 will roll the state of component $C_1$ from state $C_{1B}$ to $C_{1A}$.

In case of a failure during transition from one global state to another global state, the provisioning subsystem automatically executes undo procedures that rollback the state of individual components to the previous component state. The "undo" procedures are executed only for components that have or are in the process of being transited to the next state.

All subcomponents do not have to transition to the next state simultaneously. There may be an inherent order dependency, both component and procedure dependency, based on the provisioning steps needed to complete the tasks associated with transition to the next state. Also, not all components need to transition to the next state as the global state changes. For example, in FIG. 7, the state of component $C_3$ remains $C_{3A}$ as the global state transitions from State A to State B.

Figure 8:
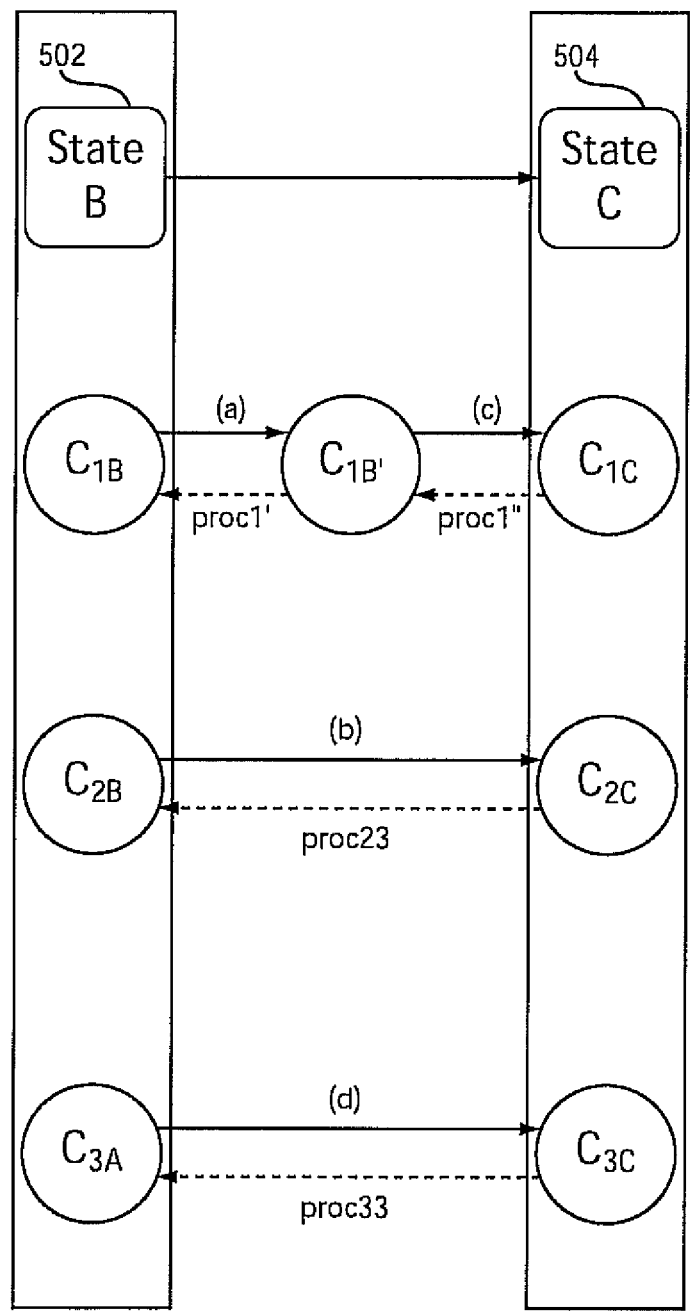
FIG. 8 is another diagram illustrating the global states of FIG. 5 along with component level state transitions and rollback transitions to move between global states in accordance with the present principles.

Referring to FIG. 8, an example of order dependency among the state transitions is illustratively depicted. Component $C_1$ transitions to an intermediate state $C_{1B'}$ as a result of executing a procedure (a). Next, the component $C_2$ transitions from state $C_{2B}$ to $C_{2C}$ as a result of executing procedure (b). After this transition is complete, component $C_1$ transitions from the intermediate state $C_{1B'}$ to $C_{1C}$ as a result of executing procedure (c). Component $C_3$ transitions from $C_{3A}$ to $C_{3C}$ as a result of executing procedure (d). If any of steps (a) through (d) fail, the individual rollback procedures (e.g., proc1', proc1", proc23, proc 33) are run in reverse order to achieve the previous global state.

Having described preferred embodiments of a system and method for restartable provisioning of software components (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for associating a state with a distributed system and transitioning component states with recovery ability to reverse transitioning attempts, the method comprising:
    defining a global state representing an overall provisioning state of a plurality of components involved in a distributed system wherein a set of global states are employed as provisioning checkpoints;
    defining individual software component methods for transitioning from one state to another using the provisioning checkpoints;
    associating individual states of the plurality of components with a global state using the provisioning checkpoints; and
    defining a rollback method by which a destination global state may be rolled back to a previous global state, while non-failed processes or components continue to run in an event of a process or component failure, and failed processes or components being individually rolled back to a previous state, wherein the rollback method includes reversing at least one of the software component methods with a reverse transitioning, or undo procedure.

2. The method as recited in claim 1, wherein defining a rollback method includes defining a single process that rolls back all of the individual component transitions that were initiated in a failed transition.

3. The method as recited in claim 1, wherein defining a rollback method includes defining individual roll back procedures associated with individual state transition activities at a component level.

4. The method as recited in claim 1, further comprising transitioning components directly from an initial global state to a next global state in a single step.

5. The method as recited in claim 1, further comprising transitioning components to an intermediate component level state that are not part of any global state checkpoint.

6. The method as recited in claim 1, further comprising transitioning components without maintaining any order dependency across the components moving from one global state checkpoint to another global state checkpoint.

7. The method as recited in claim 1, further comprising transitioning components maintaining order dependency across the components moving from one global state checkpoint to another global state checkpoint.

8. The method as recited in claim 1, further comprising:
    determining a reason for failure;
    if the reason for failure is determined, continue transitioning between states; and
    otherwise, the system remains in a known state of failure.

9. A computer readable storage medium comprising a computer readable program for associating a state with a distributed system and transitioning component states with recovery to reverse transitioning attempts, wherein the computer readable program when executed on a computer causes the computer to perform the steps of:
    defining a global state representing an overall provisioning state of a plurality of components involved in a distributed system wherein a set of global states are employed as provisioning checkpoints;
    defining individual software component methods for transitioning from one state to another using the provisioning checkpoints;
    associating individual states of the plurality of components with a global state using the provisioning checkpoints; and
    defining a rollback method by which a destination global state may be rolled back to a previous global state, while non-failed processes or components continue to run in an event of a process or component failure, and failed processes or components being individually rolled back to a previous state, wherein the rollback method includes reversing at least one of the software component methods with a reverse transitioning, or undo procedure.

10. The computer readable medium as recited in claim 9, wherein defining a rollback method includes defining a single process that rolls back all of the individual component transitions that were initiated in a failed transition.

11. The computer readable medium as recited in claim 9, wherein defining a rollback method includes defining individual roll back procedures associated with individual state transition activities at a component level.

12. The computer readable medium as recited in claim 9, further comprising transitioning components directly from an initial global state to a next global state in a single step.

13. The computer readable medium as recited in claim 9, further comprising transitioning components to an intermediate component level state that are not part of any global state checkpoint.

14. The computer readable medium as recited in claim 9, further comprising transitioning components without maintaining any order dependency across the components moving from one global state checkpoint to another global state checkpoint.

15. The computer readable medium as recited in claim 9, further comprising transitioning components maintaining order dependency across the components moving from one global state checkpoint to another global state checkpoint.

16. The computer readable medium as recited in claim 9, further comprising:
    determining a reason for failure;
    if the reason for failure is determined, continue transitioning between states; and
    otherwise, the system remains in a known state of failure.

17. An automated provisioning system for provisioning of computing resources, with a processor, in a distributed computing network, comprising:
    a plurality of global states, each global state representing an overall provisioning state of a plurality of components involved in a distributed system wherein a set of global states are employed as provisioning checkpoints;

a plurality of individual states, each individual state being associated with a global state and having individual software component methods configured to permit transitioning of the individual states from one state to another using the provisioning checkpoints; and a rollback method by which a destination global state may be rolled back to a previous global state, while non-failed processes or components continue to run in an event of a process or component failure, and failed processes or components being individually rolled back to a previous state, wherein the rollback method includes reversing at least one of the software component methods with a reverse transitioning, or undo procedure.

18. The system as recited in claim 17, wherein the rollback method includes a single process that rolls back all of the individual component transitions that were initiated in a failed transition.

19. The system as recited in claim 17, wherein the rollback method includes individual roll back procedures associated with individual state transition activities at a component level.

20. The system as recited in claim 17, wherein the plurality of components includes components configured to be transitioned directly from an initial global state to a next global state in a single step.

21. The system as recited in claim 17, wherein the plurality of components includes components configured to be transitioned in an intermediate component level state that is not part of any global state checkpoint.

22. The system as recited in claim 17, wherein the plurality of components include components configured to be transitioned without maintaining any order dependency across the components moving from one global state checkpoint to another global state checkpoint.

23. The system as recited in claim 17, wherein the plurality of components include components configured to be transitioned while maintaining order dependency across the components moving from one global state checkpoint to another global state checkpoint.

* * * * *